(12) United States Patent
Wu et al.

(10) Patent No.: US 11,381,394 B2
(45) Date of Patent: Jul. 5, 2022

(54) HIGH SPEED ENCRYPTION KEY GENERATING ENGINE

(71) Applicant: PUFsecurity Corporation, Hsinchu County (TW)

(72) Inventors: Meng-Yi Wu, Hsinchu County (TW); Ching-Sung Yang, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 104 days.

(21) Appl. No.: 16/930,336

(22) Filed: Jul. 16, 2020

(65) Prior Publication Data

US 2021/0028935 A1 Jan. 28, 2021

Related U.S. Application Data

(60) Provisional application No. 62/878,725, filed on Jul. 25, 2019.

(51) Int. Cl.
| | |
|---|---|
| *H04L 29/06* | (2006.01) |
| *H04L 9/08* | (2006.01) |
| *H04L 9/06* | (2006.01) |
| *H04L 9/32* | (2006.01) |
| *G06F 7/58* | (2006.01) |

(52) U.S. Cl.
CPC .......... *H04L 9/0869* (2013.01); *G06F 7/588* (2013.01); *H04L 9/06* (2013.01); *H04L 9/085* (2013.01); *H04L 9/0841* (2013.01); *H04L 9/0894* (2013.01); *H04L 9/3278* (2013.01)

(58) Field of Classification Search
None
See application file for complete search history.

(56) References Cited

U.S. PATENT DOCUMENTS

| | | | |
|---|---|---|---|
| 8,594,326 B2 | 11/2013 | Kerins | |
| 8,667,265 B1* | 3/2014 | Hamlet | H04L 9/0866 713/150 |
| 9,158,906 B2* | 10/2015 | Guajardo Merchan | H04L 9/0866 |
| 9,934,400 B2 | 4/2018 | Gilbert | |
| 2013/0094649 A1* | 4/2013 | Tomlinson | H04L 9/3026 380/30 |

(Continued)

FOREIGN PATENT DOCUMENTS

| | | |
|---|---|---|
| EP | 3 407 335 A1 | 11/2018 |
| JP | 2012-174147 A | 9/2012 |

(Continued)

*Primary Examiner* — Maung T Lwin
(74) *Attorney, Agent, or Firm* — Winston Hsu

(57) ABSTRACT

An encryption key generating engine includes a random number pool, an entangling string generator, and a control circuit. The random number pool stores a plurality of random bits, and values of the plurality of random bits are generated randomly. The entangling string generator provides an entangling string according to an input key. The control circuit is coupled to the random number pool and the entangling string generator. The control circuit retrieves a sequence of random bits from the plurality of random bits stored in the random number pool according to the input key, receive the entangling string from the entangling string generator, and entangle the entangling string with the sequence of random bits to generate a secret key.

14 Claims, 4 Drawing Sheets

(56) References Cited

U.S. PATENT DOCUMENTS

| | | | |
|---|---|---|---|
| 2015/0067012 A1* | 3/2015 | Goettfert | G06F 17/16 |
| | | | 708/520 |
| 2016/0170711 A1* | 6/2016 | Alon | G06F 7/588 |
| | | | 708/250 |
| 2016/0204781 A1* | 7/2016 | Plusquellic | H03K 19/215 |
| | | | 326/8 |
| 2018/0076957 A1* | 3/2018 | Watanabe | G06Q 20/363 |
| 2018/0101360 A1 | 4/2018 | Kawai | |
| 2018/0123808 A1* | 5/2018 | Hung | H04L 9/0866 |
| 2018/0131527 A1 | 5/2018 | Lu | |
| 2018/0212609 A1 | 7/2018 | Usuda | |
| 2019/0273617 A1* | 9/2019 | Maher | H04L 9/0844 |

FOREIGN PATENT DOCUMENTS

| | | |
|---|---|---|
| JP | 2012-252195 A | 12/2012 |
| JP | 2016-81247 A | 5/2016 |
| JP | 2019-54509 A | 4/2019 |

* cited by examiner

HIGH SPEED ENCRYPTION KEY GENERATING ENGINE

CROSS REFERENCE TO RELATED APPLICATIONS

This non-provisional application claims priority of U.S. provisional application No. 62/878,725, filed on Jul. 25, 2019, included herein by reference in its entirety.

BACKGROUND OF THE INVENTION

1. Field of the Invention

The present invention is related to an encryption key generating engine, and more particularly to a high speed encryption key generating engine.

2. Description of the Prior Art

A stream cipher is a symmetric key cipher usually used to encrypt files of larger sizes. In a stream cipher, each plaintext digit is encrypted with a corresponding digit of a key stream. Therefore, to encrypt a large file, such as an image file or a video file, the encryption device has to generate a great amount of random bits to generate the required key stream.

In prior art, the key stream is usually generated by using hash functions. However, the calculations for performing a hash function require a great number of operation cycles, so the encryption process is time-consuming and may even delay the data transmission.

SUMMARY OF THE INVENTION

One embodiment of the present invention discloses an encryption key generating engine. The encryption key generating engine includes a random number pool, an entangling string generator, and a control circuit.

The random number pool stores a plurality of random bits, and values of the plurality of random bits are generated randomly. The entangling string generator provides an entangling string according to an input key.

The control circuit is coupled to the random number pool and the entangling string generator. The control circuit retrieves a sequence of random bits from the plurality of random bits stored in the random number pool according to the input key, receive the entangling string from the entangling string generator, and entangle the entangling string with the sequence of random bits to generate a secret key.

Another embodiment of the present invention discloses a transmission system. The transmission system includes a first device and a second device.

The first device includes a first encryption key generating engine and an encryption unit. The first encryption key generating engine includes a first random number pool, a first entangling string generator, and a first control circuit.

The first random number pool stores a plurality of random bits, and values of the plurality of random bits are generated randomly. The first entangling string generator provides an entangling string according to an input key. The first control circuit is coupled to the first random number pool and the first entangling string generator. The first control circuit retrieves a sequence of random bits from the plurality of random bits stored in the first random number pool according to the input key, receive the entangling string from the first entangling string generator, and entangle the entangling string with the sequence of random bits to generate a secret key. The encryption unit encrypts a transmission data with the secret key to generate a cipher string.

The second device includes a second encryption key generating engine and a decryption unit. The second encryption key generating engine includes a second random number pool, a second entangling string generator, and a second control circuit.

The second encryption key generating engine includes a second random number pool, a second entangling string generator, and a second control circuit.

The second random number pool stores the plurality of random bits. The second entangling string generator provides the entangling string according to the input key. The second control circuit is coupled to the second random number pool and the second entangling string generator. The second control circuit retrieves the sequence of random bits from the plurality of random bits stored in the second random number pool according to the input key, receive the entangling string from the second entangling string generator, and entangle the entangling string with the sequence of random bits to generate the secret key. The decryption unit decrypts the cipher string with the first secret key to derive the transmission data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
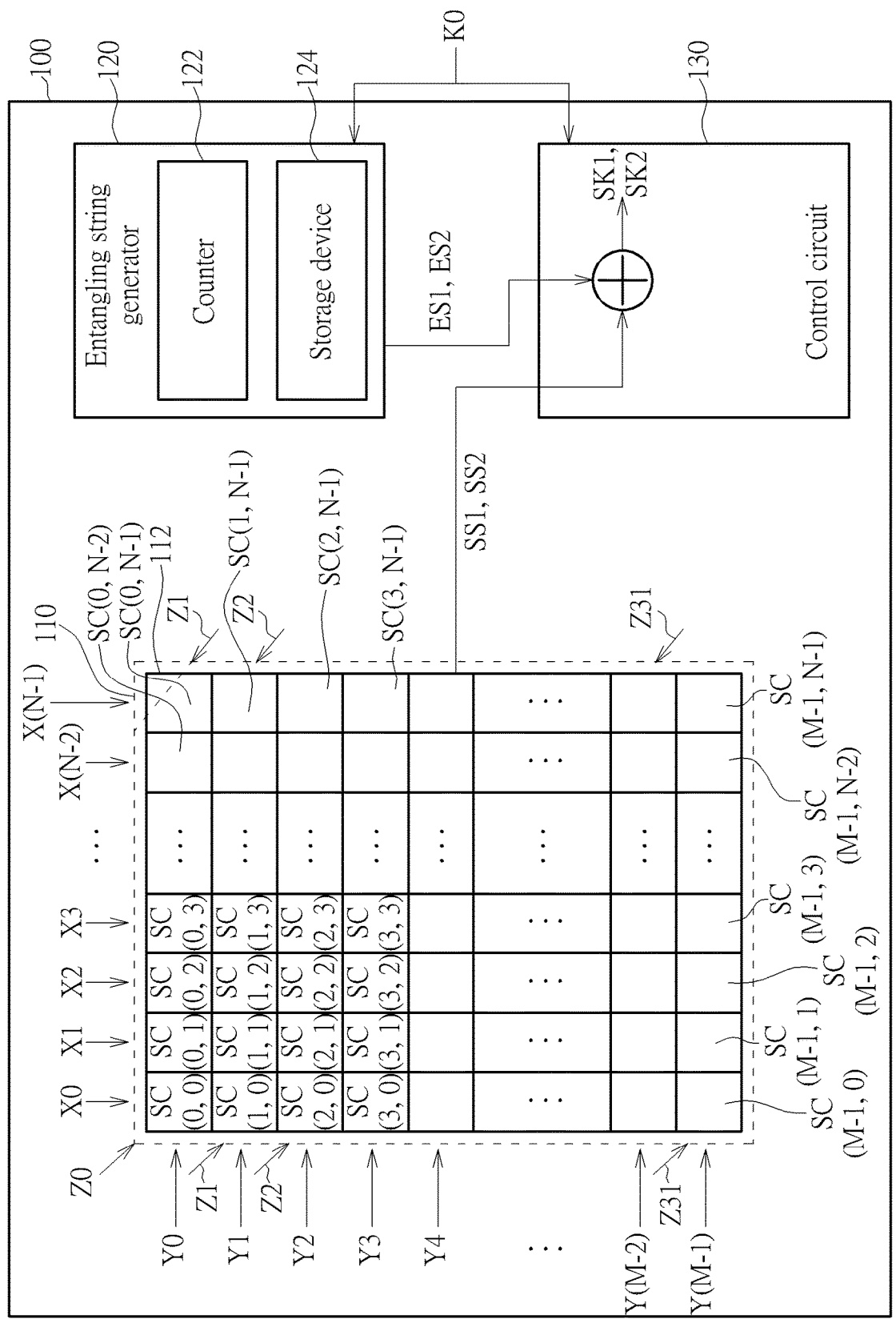
FIG. 1 shows an encryption key generating engine according to one embodiment of the present invention.

FIG. 1 shows an encryption key generating engine 100 according to one embodiment of the present invention. The encryption key generating engine 100 includes a random number pool 110, an entangling string generator 120, and a control circuit 130.

The random number pool 110 can store a plurality of random bits, and values of the plurality of random bits are generated randomly. The entangling string generator 120 can provide a plurality of entangling strings. The control circuit 130 is coupled to the random number pool 110 and the entangling string generator 120. In some embodiments, when the encryption key generating engine 100 is requested to generate secret keys for encryption, the encryption key generating engine 100 would receive an input key K0 as an initial seed for generating the secret keys.

For example, the entangling string generator 120 can provide a first entangling string ES1 according to the input key K0, and the control circuit 130 can retrieve a first sequence of random bits SS1 from the random bits stored in the random number pool 110 according to the input key K0. Then, the control circuit 130 can receive the first entangling string ES1 from the entangling string generator 120, and entangle the entangling string ES1 with the first sequence of random bits SS1 to generate the first secret key SK1.

In some embodiments, the random number pool 110 can include a storage cell array 112, the storage cell array 112 includes a plurality of storage cells SC(0,0) to SC(M−1,N−1) each storing a random bit, where M and N are positive integers. In some embodiments, the control circuit 130 can retrieve the first sequence of random bits SS1 by selecting random bits stored in a specific row of the storage cell array 112 according to the input key K0. For example, in FIG. 1, there are M rows of storage cells numbered from Y0 to Y(M−1). In some embodiments, the input key K0 can be used to select a corresponding row of the M rows of storage cells, and the random bits stored in the selected row of storage cells can be retrieved to form the first sequence of random bits SS1. For example, if the row Y2 is selected, then the random bits stored in the selected row of storage cells SC(2,0) to SC(2,N−1) will be used to form the first sequence of random bits SS1.

Since the values of the random bits stored in the random number pool 110 are randomly generated, the sequence of random bits retrieved from each row of the storage cells is also random and unpredictable, making the first sequence of random bits SS1 suitable for generating the first secret key SK1.

Similarly, the sequence of random bits retrieved from each column of the storage cells is also random and unpredictable. Therefore, in some embodiments, the control circuit 130 may select a corresponding column of N columns of storage cells according to the input key K0, and the random bits stored in the selected column of storage cells can be retrieved to form the first sequence of random bits SS1. Also, since the sequence of random bits retrieved from each askew line of the storage cells is also random and unpredictable, the control circuit 130 may select corresponding storage cells along an askew line according to the input key K0 to form the first sequence of random bits SS1.

Furthermore, in some embodiments, the control circuit 130 can retrieve random bits stored in a corresponding row of storage cells, random bits stored in a corresponding column of storage cells, and random bits stored in storage cells along a corresponding askew line to form the first sequence of random bits SS1. For example, if M and N are both 32, the control circuit 130 may use five bits of the input key K0 as a selection index to determine the corresponding row of the rows Y0 to Y(M−1) of storage cells, use another five bits of the input key K0 to determine the corresponding column of the columns X0 to X(N−1) of storage cells, and use another five bits of the input key K0 to determine the corresponding askew line of the askew lines Z0 to Z31 of storage cells. For example, if the input key K0 is "00011-00001-00010", then the first five bits "00011" may be used to select the row Y3 of the 32 rows of storage cells, so the random bits stored in the fourth row Y3 of the storage cells SC(3,0) to SC(3,N−1) are retrieved. Also, the second five bits "00001" may be used to select the column X1 of the 32 columns of storage cells, so the random bits stored in the column X1 of the storage cells SC(0,1) to SC(M−1,1) are retrieved. The third five bits "00010" may be used to select the askew line Z2 of the 32 askew lines, so the random bits stored in storage cells SC(2,0) to SC(1,N−1) and SC(0,N−2) on the askew line Z2 are retrieved. Afterwards, the random bits stored in row Y3, column X1, and askew line Z2 of the storage cell array 112 can be combined to form the first sequence of random bits SS1 having 96 bits.

In some embodiments, different retrieving scheme may be adopted to further increase the length of the first sequence of the random bits SS1 according to the system requirement. For example, while askew lines Z0 to Z31 are numbered along a top-left to bottom-right direction, askew lines numbered along a top-right to bottom-left direction can also be used to retrieve more random bits. However, instead of retrieving the random bits sequentially along each row, each column or each askew line, the retrieving order of the random bits in each row, each column or each askew line can be predetermined arbitrarily. Furthermore, instead of retrieving the random bits along a row, a column and/or an askew line, the control circuit 130 can also retrieve a sequence of random bits according to any other predetermined order corresponding to the input key K0. For example, the control circuit 130 may retrieve the first, the third, the fifth and the succeeding random bits stored in the odd storage cells along row Y1 and retrieve the second, the fourth, the sixth and the succeeding random bits stored in the even storage cells along column X2 to generate the desired sequence of random bits. Since the control circuit 130 can retrieve different sequences of random bits by selecting random bits stored in different storage cells SC(0,0) to SC (M−1,N−1) of the random number pool 110 according the input key K0 without performing complicated calculation, the generation of secret keys can be very fast.

In FIG. 1, the storage cells SC(0,0) to SC(M−1,N−1) can be implemented by physical unclonable function (PUF) cells, so each of the storage cells SC(0,0) to SC(M−1,N−1) can generate a random bit according to its intrinsic characteristics and store the random bit accordingly. In this case, each encryption key generating engine 100 will have its unique random number pool. Therefore, even if the same input key is used, the different encryption key generating engines 100 will generate different secret keys.

However, in some embodiments, the random bits should be independent and identically distributed (IID). For example, the random bits can be generated or managed by a hardware security module (HSM), and the random bits stored in the storage cells SC(0,0) to SC(M−1,N−1) can be assigned by the hardware security module, ensuring the distribution of the random bits to be independent and identically.

In some embodiments, the entangling string generator 120 can be used to further increase the space of secret keys. That is, by entangling the retrieved sequence of random bit with a plurality of entangling strings provided by the entangling string generator 120, a plurality of different secret keys can be generated. Consequently, the size of the random number pool 110 can be reduced.

In FIG. 1, the entangling string generator 120 includes a counter 122 and a storage device 124 for storing a plurality of entangling strings. In some embodiments, the entangling string generator 120 can use part of the input key K0 as an initial index for obtaining the first entangling string ES1. For example, if the storage device 124 stores 32 different entangling strings, then the first five bits of the input key K0 may be taken as the initial index for selecting the corresponding entangling string from the 32 entangling strings. Consequently, the first secret key SK1 can be generated by entangling the first entangling string ES1 with the first sequence of random bits SS1. In some embodiments, the first entangling string ES1 and the first sequence of random bits SS1 can have the same length of bits, and a bitwise exclusive OR (XOR) operation can be performed to entangle the first entangling string ES1 and the first sequence of random bits SS1. However, in some other embodiments, the bit lengths of the entangling string and the sequence of random bits can be different, and/or different entangling techniques, such as substitution, can be adopted.

Also, the counter 122 can update a counter value whenever an entangling string is provided. Therefore, after the first entangling string ES1 is provided, the entangling string generator 120 can further retrieve a second entangling string ES2 from the plurality of entangling strings according to the updated counter value. Also, in some embodiments, the control circuit 130 can entangle the second entangling string ES2 with the first sequence of random bits SS1 to generate a second secret key SK2, and so on. Consequently, in the present embodiment, the encryption key generating engine 100 is able to generate 32 different secret keys according to the first sequence of random bits SS1 and the 32 different entangling strings provided by the entangling string generator 120.

However, in some embodiments, instead of entangling different entangling strings with the first sequence of random bits SS1 to generate a series of secret keys, the control circuit 130 may also retrieve another sequence of random bits whenever the counter value is updated. In this case, the second entangling string ES2 can be entangled with the second sequence of random bits SS2 to generate the second secret key SK2, making the secret keys even more unpredictable. In some embodiments, the second sequence of random bits SS2 can be retrieved according to a new input key; however, in some other embodiments, the second sequence of random bits SS2 can be retrieved by using the random bits stored in the storage cells of the next row, the next column, and the next askew line of those used to generate the first sequence of random bits SS1. In this case, no new input key would be required. In some embodiments, the input key can be updated periodically to make the secret keys more unpredictable.

Figure 2:
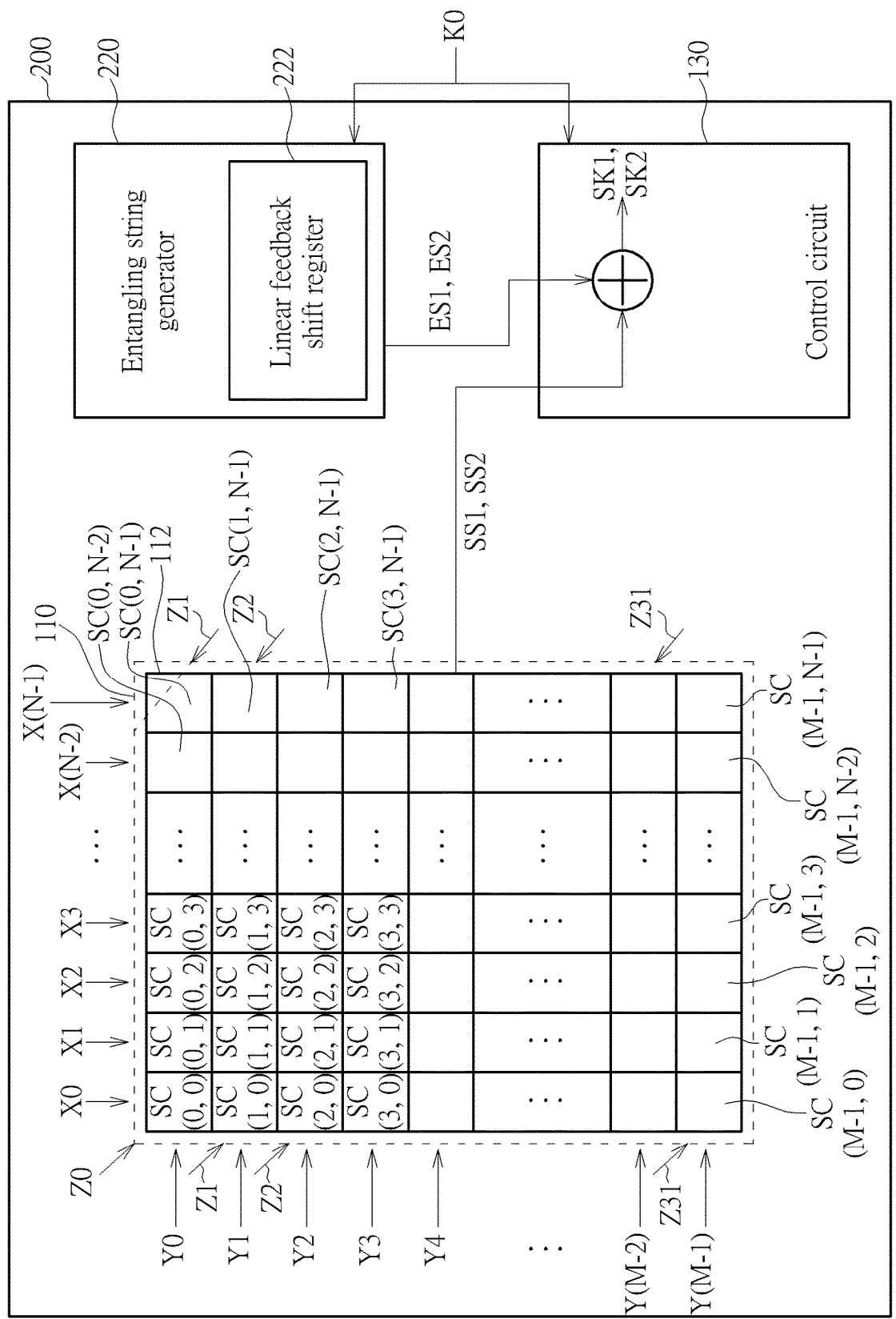
FIG. 2 shows an encryption key generating engine according to another embodiment of the present invention.

In FIG. 1, the entangling string generator 120 can use the counter 122 to select the corresponding entangling strings, and the counter value can be updated by incrementing or decrementing a predetermined number or by following a predetermined sequence. However, in some other embodiments, the entangling strings can be provided by using a linear feedback shift register (LFSR). FIG. 2 shows an encryption key generating engine 200 according to another embodiment. The encryption key generating engine 200 and the encryption key generating engine 100 have similar structures and can be operated with similar principles. However, the entangling string generator 220 can include a linear feedback shift register 222. The entangling string generator 220 can use the input key K0 as an initial seed for the linear feedback shift register 222 to generate the first entangling string ES1, and the linear feedback shift register 222 can further generate a second entangling string ES2 after the first entangling string ES1 is provided accordingly. Consequently, the control circuit 130 can entangle the second entangling string ES2 with the first sequence of random bits SS1 or a second sequence of random bits SS2 to generate the second secret key SK2. In some embodiments, the number of different entangling strings generated by the linear feedback shift register 222 may be designed and predetermined according to the system requirement.

Figure 3:
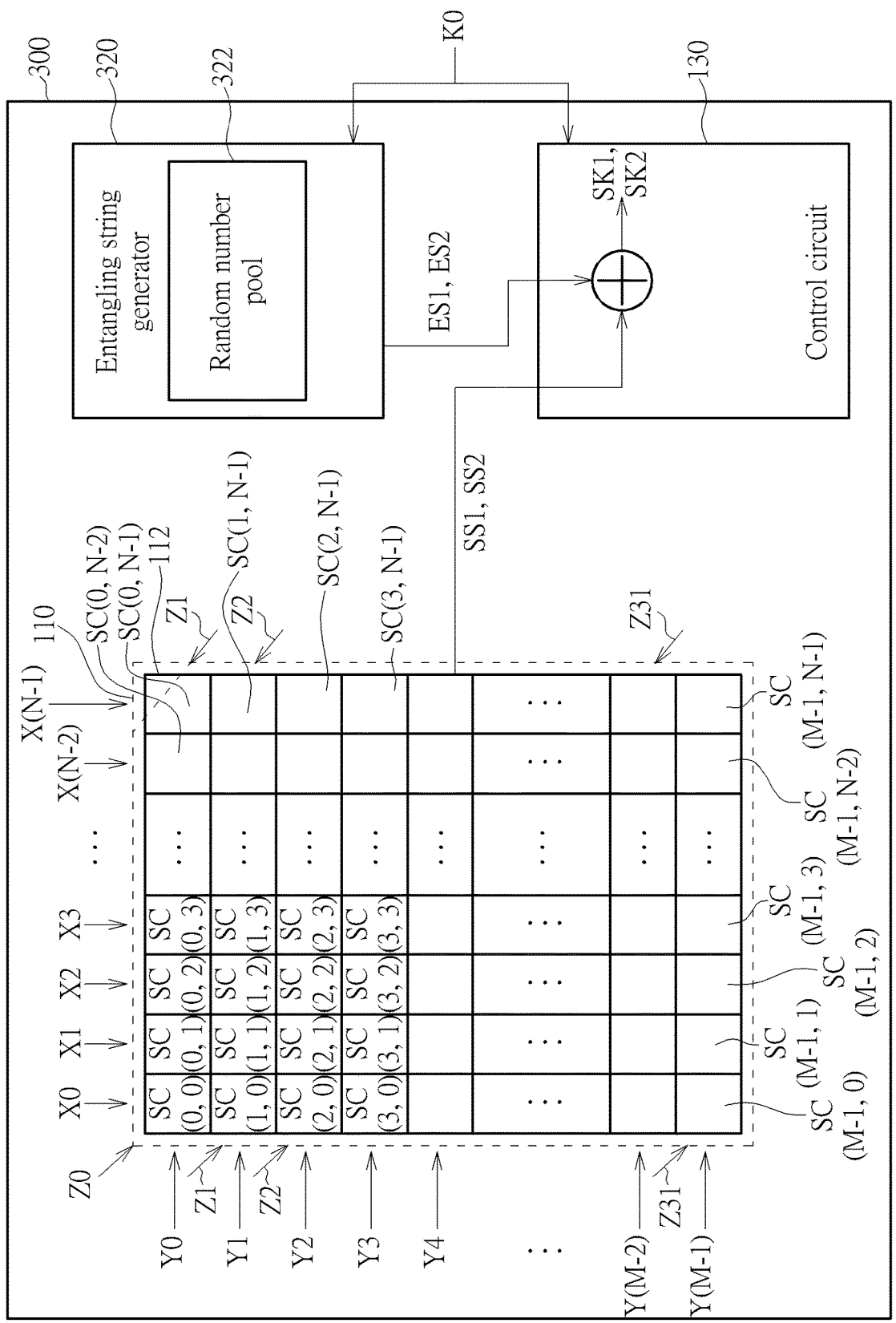
FIG. 3 shows an encryption key generating engine according to another embodiment of the present invention.

FIG. 3 shows an encryption key generating engine 300 according to another embodiment. The encryption key generating engine 300 and the encryption key generating engine 100 have similar structures and can be operated with similar principles. However, the entangling string generator 320 can include a random number pool 322. The random number pool 322 can store a plurality of random bits, and the entangling string generator 320 can provide the first entangling string ES1 by selecting a sequence of random bits stored in the random number pool 322 according to the input key K0. In some embodiments, the similar approaches used by the control circuit 130 for retrieving the sequences of random bits from the random number pool 110 can be adopted by the entangling string generator 320 for retrieving a series of entangling strings. Consequently, the space of the secret keys can be further increased.

In some embodiments, the input key K0 can be generated according to physical characteristics of hardware circuits, such as the PUF circuits, or specific algorithms implemented by software functions, such as the key derivation functions (KDF) using, for example but not limited to, the hash functions or the advanced encryption standard (AES) functions. Also, in some embodiments, since the input key K0 is used as an initial seed for generating the secret keys, the requirement for randomness of the input key is not as strict as the secret keys. Therefore, the encryption key generating engine 100 may use any types of data, such as addresses, data, block indices or waveforms as the input key K0, further simplifying the burden of the encryption key generating engine 100.

Figure 4:
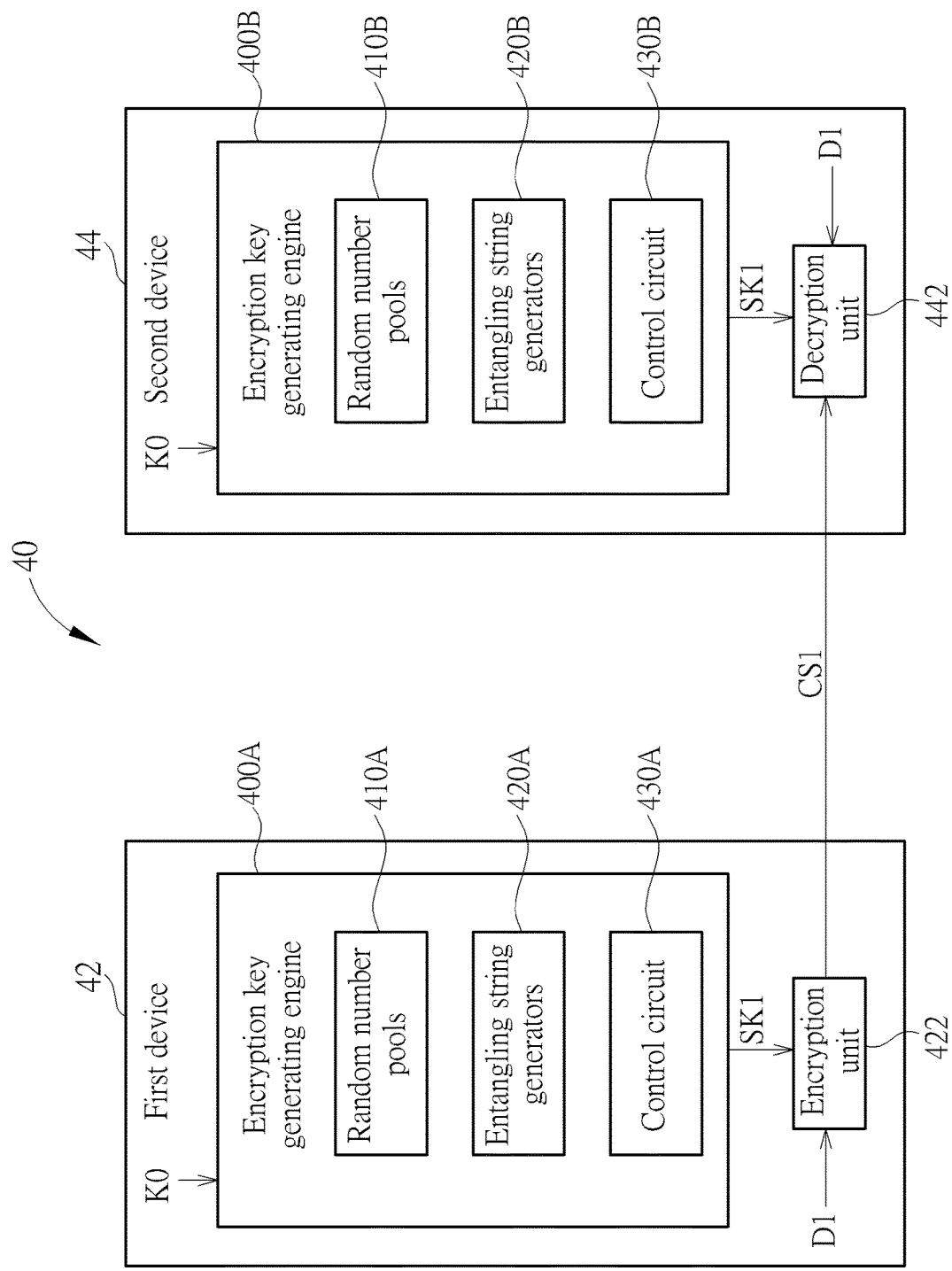
FIG. 4 shows a transmission system according to one embodiment of the present invention.

FIG. 4 shows a transmission system 40 according to one embodiment of the present invention. The transmission system 40 includes a first device 42 and a second device 44. In some embodiments, the first device 42 and the second device 44 can be any devices that require data transmission in between. For example, the second device 44 can be a display device and the first device 42 can be a video content provider. In this case, the first device 42 can transmit video data to the second device 44 so that the second device 44 can display the video. To protect the transmission data from unauthorized devices, the first device 42 and the second device 44 can include encryption key generating engines for data encryption and data decryption.

In FIG. 4, the first device 42 includes an encryption key generating engine 400A and an encryption unit 422, and the second device 44 includes an encryption key generating engine 400B and a decryption unit 442. In some embodiments, the encryption key generating engine 400A can generate a first secret key SK1, and the encryption unit 422 can encrypt a transmission data D1 with the first secret key SK1 to generate a cipher string CS1. Also, the encryption key generating engine 400B can generate the same first secret key SK1, so the decryption unit 442 can decrypt the cipher string CS1 with the first secret key SK1 to derive the transmission data D1. For example, the encryption unit 422 can perform a bitwise XOR computation to the first secret key SK1 and the transmission data D1 to generate the cipher string CS1, and the decryption unit 442 can also perform a bitwise XOR computation to the first secret key SK1 and the cipher string CS1 to obtain the transmission data D1. However, in some other embodiments, the encryption unit 422 and the decryption unit 442 can adopt other types of reversible encryption operations to encrypt the transmission data with the secret keys according to the system requirement.

In some embodiments, the encryption key generating engines 400A and 400B can be identical. For example, the encryption key generating engines 400A and 400B can both be implemented by using the encryption key generating engine 100. Furthermore, the encryption key generating engines 400A and 400B can store the same data. That is, the random number pools 410A and 410B of the encryption key generating engines 400A and 400B can store the same random bits with the same arrangement, and the entangling string generators 420A and 420B of the encryption key generating engines 400A and 400B can provide the same entangling string when the same initial seed is used. Therefore, with the same input key K0, the control circuits 430A and 430B of the encryption key generating engines 400A and 400B will generate the same secret key.

In some embodiments, the random number pools 410A and 410B can generate the random bits according to the Elliptic Curve Diffie-Hellman Key Exchange (ECDH) algorithm, so the random number pools 410A and 410B can generate the same random bits by using the shared public keys separately. Consequently, the random bits can be stored within the random number pools 410A and 410B without being transmitted outside of the first device 42 and the second device 44 and causing threat to information safety. However, in some other embodiments, if the transmission environment is trusted and safe, then one of the random number pools 410A and 410B may generate the random bits by using a PUF circuit or a random number generator, and the generated random bits can be copied to another random number pool.

Similarly, in some embodiments, in order to share the same input key K0 safely, the first device 42 and the second device 44 can generate the input key K0 separately by using the Elliptic Curve Diffie-Hellman Key Exchange (ECDH) algorithm. That is, the first device 42 and the second device 44 can share their public keys with each other, and use their own private keys and the shared public key to produce the same input key K0 independently. Consequently, the input key K0 can be shared without being revealed to outside of the encryption key generating engines 400A and 400B, and the encryption key generating engines 400A and 400B would be able to generate the same secret key for data encryption and data decryption. However, in some other embodiments, the input key K0 can be generated by the one of the first device 42 and the second device 44, and can be shared with another device through transmission. In this case, since the random numbers stored in the random number pools 410A and 410B are still private information, the information safety can still be preserved even if the input key K0 is transmitted outside of the first device 42 and the second device 44.

In summary, the encryption key generating engines and the transmission systems provided by the embodiments of the present invention can use random number pools to generate secret keys rapidly without using a complicate calculation, making the real-time stream cipher achievable.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission system comprising:
a first device comprising:
a first encryption key generating engine comprising:
a first random number pool configured to store a plurality of random bits, wherein values of the plurality of random bits are generated randomly;
a first entangling string generator configured to provide a first entangling string according to an input key; and
a first control circuit coupled to the first random number pool and the first entangling string generator, and configured to retrieve a first sequence of random bits from the plurality of random bits stored in the first random number pool according to the input key, receive the first entangling string from the first entangling string generator, and entangle the first entangling string with the first sequence of random bits to generate a first secret key; and
an encryption unit configured to encrypt a transmission data with the first secret key to generate a cipher string; and
a second device comprising:
a second encryption key generating engine comprising:
a second random number pool configured to store the plurality of random bits;
a second entangling string generator configured to provide the first entangling string according to the input key; and
a second control circuit coupled to the second random number pool and the second entangling string generator, and configured to retrieve the first sequence of random bits from the plurality of random bits stored in the second random number pool according to the input key, receive the first entangling string from the second entangling string generator, and entangle the first entangling string with the first sequence of random bits to generate the first secret key; and
a decryption unit configured to decrypt the cipher string with the first secret key to derive the transmission data;
wherein the first device and the second device are configured to generate the input key separately by using an Elliptic Curve Diffie-Hellman Key Exchange (ECDH) algorithm.

2. The transmission system of claim 1, wherein:
the first entangling string generator comprises a counter configured to update a counter value whenever an entangling string is provided;
the first entangling string generator is further configured to provide a second entangling string according to the counter value; and
the first control circuit is further configured to entangle the second entangling string with the first sequence of random bits or a second sequence of random bits to generate a second secret key.

3. The transmission system of claim 1, wherein:
the first entangling string generator comprises a linear feedback shift register (LFSR);
the first entangling string generator is further configured to provide a second entangling string after the first entangling string is provided according to the linear feedback shift register; and
the first control circuit is further configured to entangle the second entangling string with the first sequence of random bits or a second sequence of random bits to generate a second secret key.

4. The transmission system of claim 1, wherein:
the first random number pool comprises a storage cell array comprising a plurality of storage cells configured to store the plurality of random bits; and
the first control circuit retrieves the first sequence of random bits by selecting random bits stored in a part of the plurality of storage cells according to a predetermined order corresponding to the input key.

5. The transmission system of claim 1, wherein the first random bit pool comprises a plurality of physical unclonable function (PUF) cells for generating the plurality of random bits, and the plurality of random bits generated by the plurality of PUF cells are copied to the second random bit pool.

6. The transmission system of claim 1, wherein:
the first device is configured to generate the input key and transmit the input key to the second device.

7. The transmission system of claim 1, wherein:
the first entangling string generator comprises a third random number pool configured to store a plurality of random bits; and
the first entangling string generator provides the first entangling string by selecting a sequence of random bits stored in the third random number pool according to the input key.

8. A transmission system comprising:
a first device comprising:
  a first encryption key generating engine comprising:
    a first random number pool configured to store a plurality of random bits, wherein values of the plurality of random bits are generated randomly;
    a first entangling string generator configured to provide a first entangling string according to an input key; and
    a first control circuit coupled to the first random number pool and the first entangling string generator, and configured to retrieve a first sequence of random bits from the plurality of random bits stored in the first random number pool according to the input key, receive the first entangling string from the first entangling string generator, and entangle the first entangling string with the first sequence of random bits to generate a first secret key; and
  an encryption unit configured to encrypt a transmission data with the first secret key to generate a cipher string; and
a second device comprising:
  a second encryption key generating engine comprising:
    a second random number pool configured to store the plurality of random bits;
    a second entangling string generator configured to provide the first entangling string according to the input key; and
    a second control circuit coupled to the second random number pool and the second entangling string generator, and configured to retrieve the first sequence of random bits from the plurality of random bits stored in the second random number pool according to the input key, receive the first entangling string from the second entangling string generator, and entangle the first entangling string with the first sequence of random bits to generate the first secret key; and
  a decryption unit configured to decrypt the cipher string with the first secret key to derive the transmission data;

wherein the first random number pool and the second random number pool are further configured to generate the plurality of random bits by using a plurality of shared public keys according an Elliptic Curve Diffie-Hellman Key Exchange (ECDH) algorithm.

9. The transmission system of claim 8, wherein:
the first entangling string generator comprises a counter configured to update a counter value whenever an entangling string is provided;
the first entangling string generator is further configured to provide a second entangling string according to the counter value; and
the first control circuit is further configured to entangle the second entangling string with the first sequence of random bits or a second sequence of random bits to generate a second secret key.

10. The transmission system of claim 8, wherein:
the first entangling string generator comprises a linear feedback shift register (LFSR);
the first entangling string generator is further configured to provide a second entangling string after the first entangling string is provided according to the linear feedback shift register; and
the first control circuit is further configured to entangle the second entangling string with the first sequence of random bits or a second sequence of random bits to generate a second secret key.

11. The transmission system of claim 8, wherein:
the first random number pool comprises a storage cell array comprising a plurality of storage cells configured to store the plurality of random bits; and
the first control circuit retrieves the first sequence of random bits by selecting random bits stored in a part of the plurality of storage cells according to a predetermined order corresponding to the input key.

12. The transmission system of claim 8, wherein the first random bit pool comprises a plurality of physical unclonable function (PUF) cells for generating the plurality of random bits, and the plurality of random bits generated by the plurality of PUF cells are copied to the second random bit pool.

13. The transmission system of claim 8, wherein:
the first device is configured to generate the input key and transmit the input key to the second device.

14. The transmission system of claim 8, wherein:
the first entangling string generator comprises a third random number pool configured to store a plurality of random bits; and
the first entangling string generator provides the first entangling string by selecting a sequence of random bits stored in the third random number pool according to the input key.

* * * * *